(12) United States Patent
Dettinger et al.

(10) Patent No.: US 8,266,186 B2
(45) Date of Patent: *Sep. 11, 2012

(54) SEMANTIC MODEL ASSOCIATION BETWEEN DATA ABSTRACTION LAYER IN BUSINESS INTELLIGENCE TOOLS

(75) Inventors: Richard D. Dettinger, Rochester, MN (US); Robert R. Friedlander, Southbury, CT (US); Richard Hennessy, Austin, TX (US); David C. Martin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 12/771,178

(22) Filed: Apr. 30, 2010

(65) Prior Publication Data

US 2011/0270866 A1 Nov. 3, 2011

(51) Int. Cl.
G06F 17/30 (2006.01)
G06F 17/00 (2006.01)

(52) U.S. Cl. ........ 707/803; 707/601; 707/790; 707/796; 707/805; 707/810

(58) Field of Classification Search .......... 707/601–602, 707/713–719, 790–795, 809–810, 796, 803, 707/805; 706/45–50
See application file for complete search history.

(56) References Cited

U.S. PATENT DOCUMENTS

| | | | | |
|---|---|---|---|---|
| 5,555,403 A | * | 9/1996 | Cambot et al. ........................ 1/1 |
| 5,761,640 A | * | 6/1998 | Kalyanswamy et al. ..... 704/260 |
| 5,819,086 A | * | 10/1998 | Kroenke ................................. 1/1 |
| 6,289,352 B1 | * | 9/2001 | Proctor ................................. 1/1 |
| 6,490,593 B2 | * | 12/2002 | Proctor ................................. 1/1 |
| 6,578,027 B2 | * | 6/2003 | Cambot et al. ........................ 1/1 |
| 6,732,094 B1 | * | 5/2004 | Cousins et al. ........................ 1/1 |
| 6,996,558 B2 | * | 2/2006 | Dettinger et al. ..................... 1/1 |
| 7,574,423 B2 | * | 8/2009 | Dettinger et al. ..................... 1/1 |
| 7,805,324 B2 | * | 9/2010 | Green et al. .................. 705/7.27 |
| 2003/0167274 A1 | * | 9/2003 | Dettinger et al. ............. 707/100 |
| 2004/0017394 A1 | * | 1/2004 | Adachi ......................... 345/744 |
| 2005/0050030 A1 | * | 3/2005 | Gudbjartsson et al. ........... 707/3 |
| 2006/0026189 A1 | * | 2/2006 | Djugash et al. ............... 707/102 |
| 2006/0212418 A1 | * | 9/2006 | Dettinger et al. ................ 707/1 |
| 2007/0100835 A1 | * | 5/2007 | Carter ............................ 707/10 |
| 2007/0112586 A1 | * | 5/2007 | Dettinger et al. ................. 705/2 |

(Continued)

FOREIGN PATENT DOCUMENTS

| | | | |
|---|---|---|---|
| WO | WO 96/41282 | * | 12/1996 |
| WO | WO 2008/027767 | * | 3/2008 |
| WO | WO 2012054179 | * | 4/2012 |

OTHER PUBLICATIONS

Wai Yin Mok, "Designing nesting structures of user-defined types in object-relational databases", Information and Software Technology 49 (2007) 1017-1029.*

(Continued)

*Primary Examiner* — Srirama Channavajjala
(74) *Attorney, Agent, or Firm* — Patterson & Sheridan LLP

(57) ABSTRACT

Techniques are disclosed for determining Business Intelligence (BI) tools and/or abstract queries that use similar semantic concepts. A semantics table standardizes semantic concepts across both BI tools and a data abstraction model. A BI concept repository maps BI tools to semantic concepts used by the BI tools. A BI tool and/or an abstract query is recommended to the user, on the basis of the semantic concepts.

3 Claims, 14 Drawing Sheets

U.S. PATENT DOCUMENTS

| | | | |
|---|---|---|---|
| 2007/0266366 A1* | 11/2007 | Bucuvalas | 717/104 |
| 2008/0082493 A1* | 4/2008 | Polo-Malouvier et al. | 707/3 |
| 2008/0201280 A1* | 8/2008 | Martin et al. | 706/12 |
| 2008/0288235 A1* | 11/2008 | Dettinger et al. | 703/23 |
| 2008/0294596 A1* | 11/2008 | Xiong | 707/2 |
| 2009/0240714 A1* | 9/2009 | Keith et al. | 707/100 |
| 2010/0191718 A1* | 7/2010 | Coriell et al. | 707/714 |

OTHER PUBLICATIONS

E. Malinowski et al, "A conceptual model for temporal data warehouses and its transformation to the ER and the object-relational models",Data & Knowledge Engineering 64 (2008) 101-133.*

* cited by examiner

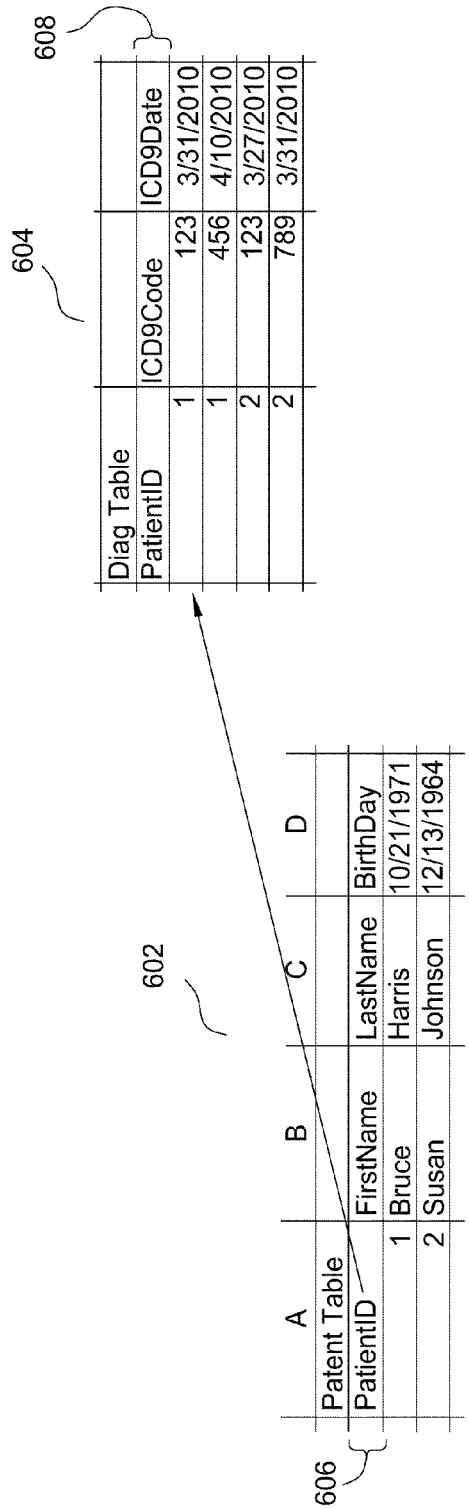

| BI Concept Respository | | |
|---|---|---|
| Object | Tool | Semantic Concept |
| Data://Patient/ID | DAM | Patient->ID |
| Data://Patient/Name/First | DAM | Patient->Name->First |
| Data://Patient/Name/Last | DAM | Patient->Name->Last |
| Data://Diagnosis/ICD9/Value | DAM | Diagnosis->ICD9->Value |
| Data://Diagnosis/ICD9/Date | DAM | Diagnosis->ICD9->Date |
| Patient:ID | BI Report | Patient->ID |
| Patient:Name:First | BI Report | Patient->Name->First |
| Patient:Name:Last | BI Report | Patient->Name->Last |
| Diagnosis:ICD9:Code | BI Report | Diagnosis->ICD9->Value |
| Diagnosis:ICD9:Date | BI Report | Diagnosis->ICD9->Date |
| Diagnosis:ICD9:Date | BI Dashboard | Diagnosis->ICD9->Date |

FIG. 10

SEMANTIC MODEL ASSOCIATION BETWEEN DATA ABSTRACTION LAYER IN BUSINESS INTELLIGENCE TOOLS

BACKGROUND OF THE INVENTION

1. Field of the Invention

Embodiments of the invention relate generally to computer databases and, more particularly, to semantic model association between a data abstraction layer in Business Intelligence tools.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation.

SUMMARY OF THE INVENTION

One embodiment of the invention provides a method that generally includes providing a data abstraction model that includes a plurality of logical field definitions, each of which maps a logical field to respective one or more physical fields of a first data source, wherein at least one logical field definition specifies one or more semantic concepts selected from a predefined hierarchy of semantic concepts. The method may also include receiving, from a user, an abstract query composed using one or more logical fields of the data abstraction model; determining at least one semantic concept associated with at least one logical field of the abstract query; determining a Business Intelligence (BI) tool that uses the determined at least one concept, wherein the BI tool accesses a second data source; and upon determining that the BI tool uses the at least one semantic concept associated with the received abstract query, notifying the user that the BI tool may be of interest to the user.

Another embodiment of the invention provides a computer-readable storage medium containing a program which, when executed, performs an operation. The operation may generally include providing a data abstraction model that includes a plurality of logical field definitions, each of which maps a logical field to respective one or more physical fields of a first data source, wherein at least one logical field definition specifies one or more semantic concepts selected from a predefined hierarchy of semantic concepts; receiving, from a user, an abstract query composed using one or more logical fields of the data abstraction model; determining at least one semantic concept associated with at least one logical field of the abstract query; determining a BI tool that uses the determined at least one concept, wherein the BI tool accesses a second data source; and upon determining that the BI tool uses the at least one semantic concept associated with the received abstract query, notifying the user that the BI tool may be of interest to the user.

Yet another embodiment of the invention provides a system that includes one or more computer processors and a memory containing a program which, when executed by the one or more computer processors, is configured to perform an operation. The operation may generally include providing a data abstraction model that includes a plurality of logical field definitions, each of which maps a logical field to respective one or more physical fields of a first data source, wherein at least one logical field definition specifies one or more semantic concepts selected from a predefined hierarchy of semantic concepts; receiving, from a user, an abstract query composed using one or more logical fields of the data abstraction model; determining at least one semantic concept associated with at least one logical field of the abstract query; determining a BI tool that uses the determined at least one concept, wherein the BI tool accesses a second data source; and upon determining that the BI tool uses the at least one semantic concept associated with the received abstract query, notifying the user that the BI tool may be of interest to the user.

Still another embodiment of the invention provides a method that generally includes providing a data abstraction model that includes a plurality of logical field definitions, each of which maps a logical field to respective one or more physical fields of a first data source, wherein at least one logical field definition specifies one or more semantic concepts selected from a predefined hierarchy of semantic concepts. The method may also include receiving, from a user, a request to execute a BI tool that specifies one or more BI tool objects and that accesses a first data source; determining at least one semantic concept associated with at least one of the one or more BI tool objects; determining an abstract query that is composed using one or more logical fields of the data abstraction model and that uses the determined at least one concept, wherein the abstract query accesses a second data source; and upon determining that the abstract query uses the at least one semantic concept associated with the BI tool, notifying the user that the abstract query may be of interest to the user.

Yet another embodiment of the invention provides a system that includes one or more computer processors and a memory containing a program which, when executed by the one or more computer processors, is configured to perform an operation. The operation may generally include providing a data abstraction model that includes a plurality of logical field definitions, each of which maps a logical field to respective one or more physical fields of a first data source, wherein at least one logical field definition specifies one or more semantic concepts selected from a predefined hierarchy of semantic concepts; receiving, from a user, a request to execute a BI tool that specifies one or more BI tool objects and that accesses a first data source; determining at least one semantic concept associated with at least one of the one or more BI tool objects; determining an abstract query that is composed using one or more logical fields of the data abstraction model and that uses the determined at least one concept, wherein the abstract query accesses a second data source; and upon determining that the abstract query uses the at least one semantic concept associated with the BI tool, notifying the user that the abstract query may be of interest to the user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 illustrates tables stored in the data warehouse of a database, according to one embodiment of the invention.

FIG. 7 illustrates a semantic model table, according to one embodiment of the invention.

FIG. 10 illustrates a BI concept repository, according to one embodiment of the invention.

DETAILED DESCRIPTION OF THE PREFERRED EMBODIMENTS

Figure 1:
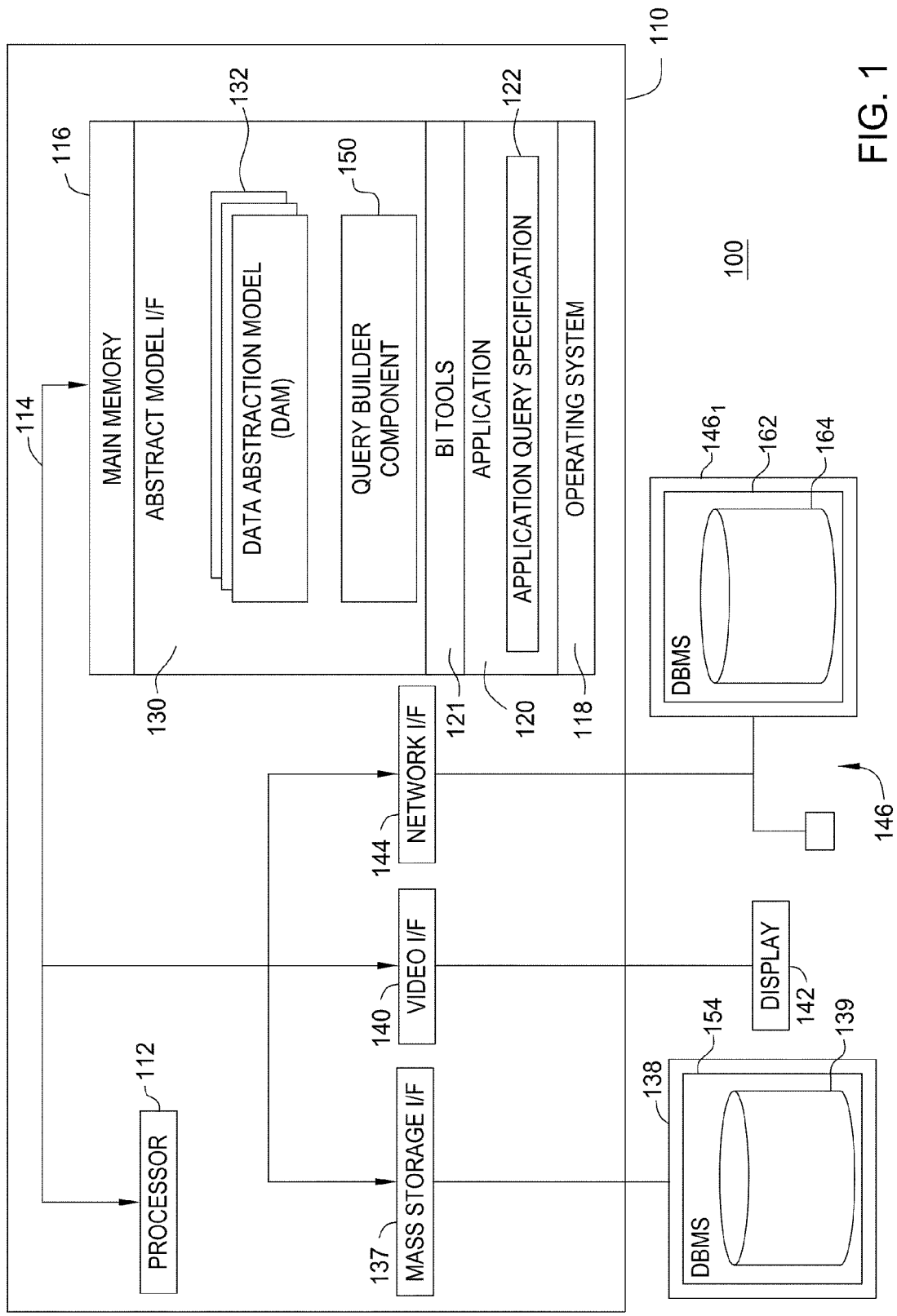
FIG. 1 is a computer system illustratively utilized according to one embodiment of the invention.

Embodiments of the invention provide techniques for identifying abstract queries and/or Business Intelligence (BI) tools that share the same semantic concepts. As used herein, BI tools refer generally to software applications configured to report, analyze and present data. The data may be stored in a data warehouse or data mart. Further, abstract queries refer to queries posed against an abstract database. According to one aspect, the abstract database includes a data abstraction model that defines a plurality of logical fields, each having a corresponding logical field specification. Each logical field specification may include a field name and access information for mapping the logical field to one or more physical entities of physical data. Accordingly, a given logical field defines an abstract representation of a specific set of the physical data and the access information can be used to access a field of the physical data which contains the specific set of the physical data.

One embodiment of the invention defines a hierarchy of semantic concepts to standardize semantic concepts between both BI tools and the data abstraction model. Further, a BI concept repository may also be provided that maps BI tools to semantic concepts used by the BI tools. The hierarchy of semantic concepts and the BI concept repository may be used to identify abstract queries and/or BI tools that share the same or similar semantic concepts. A user may then be notified that the identified abstract queries and/or BI tools may be of interest to the user. Advantageously, BI tools and abstract queries that are decoupled from one another may nevertheless be associated in a way to suggest BI tools to a user of the data abstraction model—or to suggest abstract queries to a user of a BI tool. Consequently, users may more efficiently and conveniently aggregate information across heterogeneous sources. For instance, researchers and investigators from medical and/or pharmaceutical institutions may aggregate demographic, pedigree, phenotype and genotype data more efficiently using the techniques disclosed herein.

It should be noted that embodiments of the present invention can be explained below, by way of example, with reference to the data abstraction model described above. However, other embodiments can be implemented using other types of logical models which abstractly describe physical data. Accordingly, the present invention is not limited to a particular data abstraction model, and various different logical models of physical data which abstractly describe the physical data are broadly contemplated.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD- ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary Data Processing Environment

Referring now to FIG. 1, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more applications 120, a plurality of BI tools 121, and an abstract model interface 130 to a plurality of data abstraction models 132. The applications 120, the plurality of BI tools 121, the abstract model interface 130, and the data abstraction models 132 are software products comprising a plurality of instructions that are resident at various times in various memory and storage devices in the computer system 110. When read and executed by one or more processors 112 in the computer system 110, the applications 120, the abstract model interface 130 and the data abstraction models 132 cause the computer system 110 to perform the steps necessary to execute steps or elements embodying the various aspects of the invention.

The applications 120 (and more generally, any requesting entity, including the operating system 118) are configured to issue queries against a database 139. Illustratively, the database 139 is shown as part of a database management system (DBMS) 154 in storage 138. Although only one database is shown for simplicity, the DBMS 154 may include multiple databases. Further, the databases may be distributed relative to one another. Moreover, one or more databases can be distributed to one or more of the networked devices 146. Illustratively, a networked device $146_1$ is shown having a DBMS 162 which includes a database 164. Although only a single database 164 is shown with the DBMS 162, for simplicity, the DBMS 162 may include multiple databases. Further, the databases of the DBMS 162 may be distributed relative to one another. All such different implementations are broadly contemplated. The storage 138 may also include the hierarchy of semantic concepts and the BI concept repository used by the application 120 to perform semantic model association between a data abstraction layer in BI tools.

The databases 139 and 164 are representative of any collection of data regardless of the particular physical representation of the data. A physical representation of data defines an organizational schema of the data. By way of illustration, the databases 139 and 164 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the database 139 includes a data warehouse and the database 164 includes an operational data store. The operational data store includes at least a portion of the physical data contained in the data warehouse. According to one aspect, the data warehouse contains queryable data which is derived from physical data in the operational data store. Accordingly, the queryable data in the data warehouse includes a subset of the physical data in the operational data store. In addition to the subset of data from the operational data store, the data warehouse may include other data.

In one embodiment, the queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") can be composed using logical fields defined by one of a plurality of data abstraction models 132. In one embodiment, each of the data abstraction models 132 defines a multiplicity of logical fields. A logical field defines an abstract view of data whether as an individual data item or a data structure in the form of, for example, a database table. Abstract queries are executed against the database 139 by a query builder component 150 which first transforms the abstract queries into concrete queries having a form consistent with the physical representation of the data contained in the database 139. Operation of the query builder component 150 for transformation of abstract queries into concrete queries and execution of the concrete queries is described below with reference to FIGS. 2-5.

In one embodiment, upon receiving an abstract query from a user, the application 120 determines semantic concepts associated with the abstract query. The application 120 then determines which BI tools use the semantic concepts. The application 120 may then notify the user that the BI tools may be of interest to the user. Operation of the application 120 for performing semantic model association between a data abstraction layer in BI tools is further described below with reference to FIGS. 6-18.

Logical/Runtime View of Environment

Figure 2:
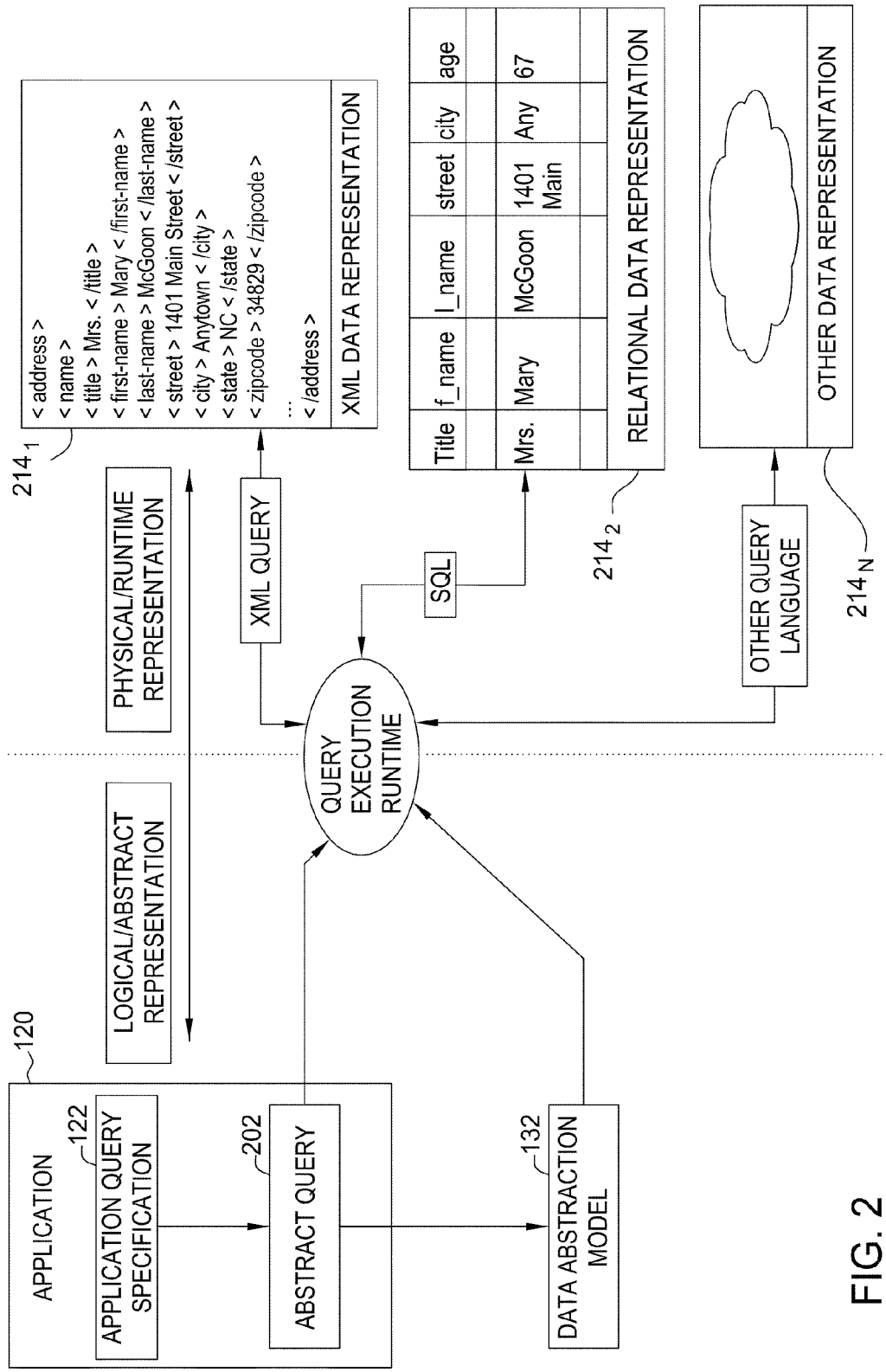
FIGS. 2-3 are relational views of software components, according to one embodiment of the invention.
Figure 3:
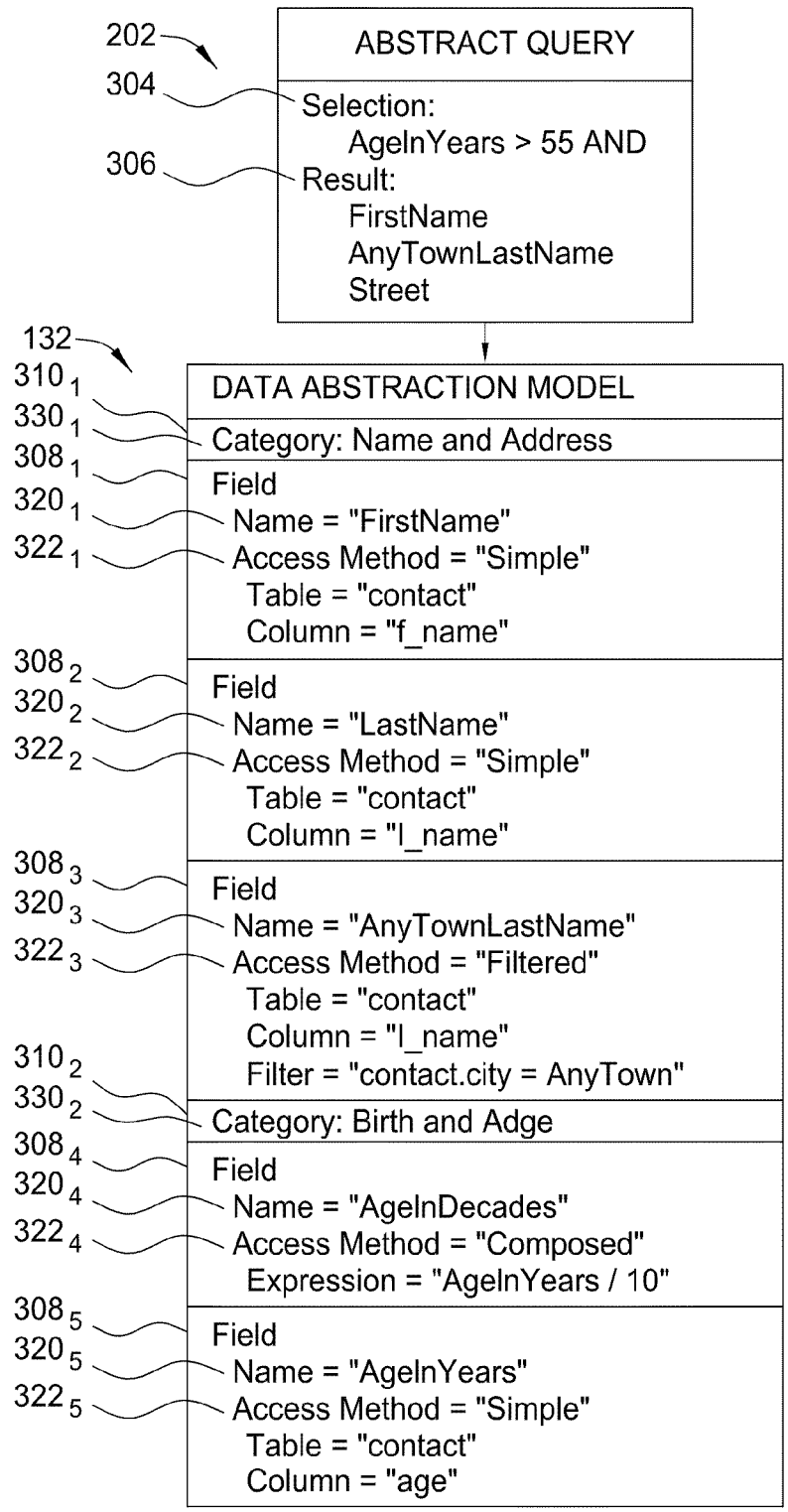

FIGS. 2-3 show an illustrative relational view of the applications 120, the application query specifications 122 and the data abstraction model 132 of FIG. 1 and other components of the invention. A requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the DBMS 154. As a result, abstract queries may be defined that are independent of the particular underlying data representation used. In one embodiment, the application query specification 122 may include both criteria used for data selection (selection criteria 304) and an explicit specification of the fields to be returned (return data specification 306) based on the selection criteria 304, as illustrated in FIG. 3.

As was noted above, the logical fields specified by the application query specification 122 and used to compose the abstract query 202 are defined by the data abstraction model 132. In general, the data abstraction model 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in a corresponding database (e.g., database 139 of FIG. 1), thereby allowing queries to be formed that are loosely coupled to the underlying data representation.

In one embodiment, illustrated in FIG. 3, the data abstraction model 132 comprises a plurality of field specifications $308_1$, $308_2$, $308_3$, $308_4$ and $308_5$ (five shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 132 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 139 of FIG. 1). As illustrated in FIG. 2, the access methods associate the logical field names to a particular physical data representation $214_1, 214_2, \ldots 214_N$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 132 contains field specifications (with associated access methods) for two or more physical data representations 214. In an alternative embodiment, a different single data abstraction model 132 is provided for each separate physical data representation 214.

Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 3 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 3 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 132 shown in FIG. 3 are representative of logical fields mapped to data represented in the relational data representation $214_2$ shown in FIG. 2. However, other instances of the data abstraction model 132 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

| | |
|---|---|
| 001 | <?xml version="1.0"?> |
| 002 | <!--Query string representation: (AgeInYears > "55"--> |
| 003 | <QueryAbstraction> |
| 004 |   <Selection> |
| 005 |     <Condition internalID="4"> |
| 006 |       <Condition field="AgeInYears" operator="GT" value="55" |
| 007 |         internalID="1"/> |
| 008 |   </Selection> |
| 009 |   <Results> |
| 010 |     <Field name="FirstName"/> |
| 011 |     <Field name="AnyTownLastName"/> |
| 012 |     <Field name="Street"/> |
| 013 |   </Results> |
| 014 | </QueryAbstraction> |

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 3 is shown in Table II below. By way of illustration, the illustrative Data Abstraction Model is defined using XML. However, any other language may be used to advantage.

TABLE II

DATA ABSTRACTION MODEL EXAMPLE

| | |
|---|---|
| 001 | <?xml version="1.0"?> |
| 002 | <DataAbstraction> |
| 003 |   <Category name="Name and Address"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |     </Field> |
| 009 |     <Field queryable="Yes" name="LastName" displayable="Yes"> |
| 010 |       <AccessMethod> |
| 011 |         <Simple columnName="l_name" tableName="contact"></Simple> |
| 012 |       </AccessMethod> |
| 013 |     </Field> |
| 014 |     <Field queryable="Yes" name="AnyTownLastName" displayable="Yes"> |
| 015 |       <AccessMethod> |
| 016 |         <Filter columnName="l_name" tableName="contact"> |
| 017 | </Filter="contact.city=Anytown"> |
| 018 |       </AccessMethod> |

TABLE II-continued

DATA ABSTRACTION MODEL EXAMPLE

```
019          </Field>
020        </Category>
021        <Category name="Birth and Age">
022          <Field queryable="Yes" name="AgeInDecades" displayable="Yes">
023            <AccessMethod>
024              <Composed columnName="age" tableName="contact">
025            </Composed Expression="columnName/10">
026            </AccessMethod>
027          </Field>
028          <Field queryable="Yes" name="AgeInYears" displayable="Yes">
029            <AccessMethod>
030                <Simple columnName="age" tableName="contact"></Simple>
031            </AccessMethod>
032          </Field>
033        </Category>
034      </DataAbstraction>
```

By way of example, note that lines 004-008 correspond to the first field specification $308_1$ of the DAM 132 shown in FIG. 3 and lines 009-013 correspond to the second field specification $308_2$.

As was noted above, the abstract query of Table I can be transformed into a concrete query for query execution. An exemplary method for transforming an abstract query into a concrete query is described below with reference to FIGS. 4-5.

Transforming an Abstract Query into a Concrete Query

Figure 4:
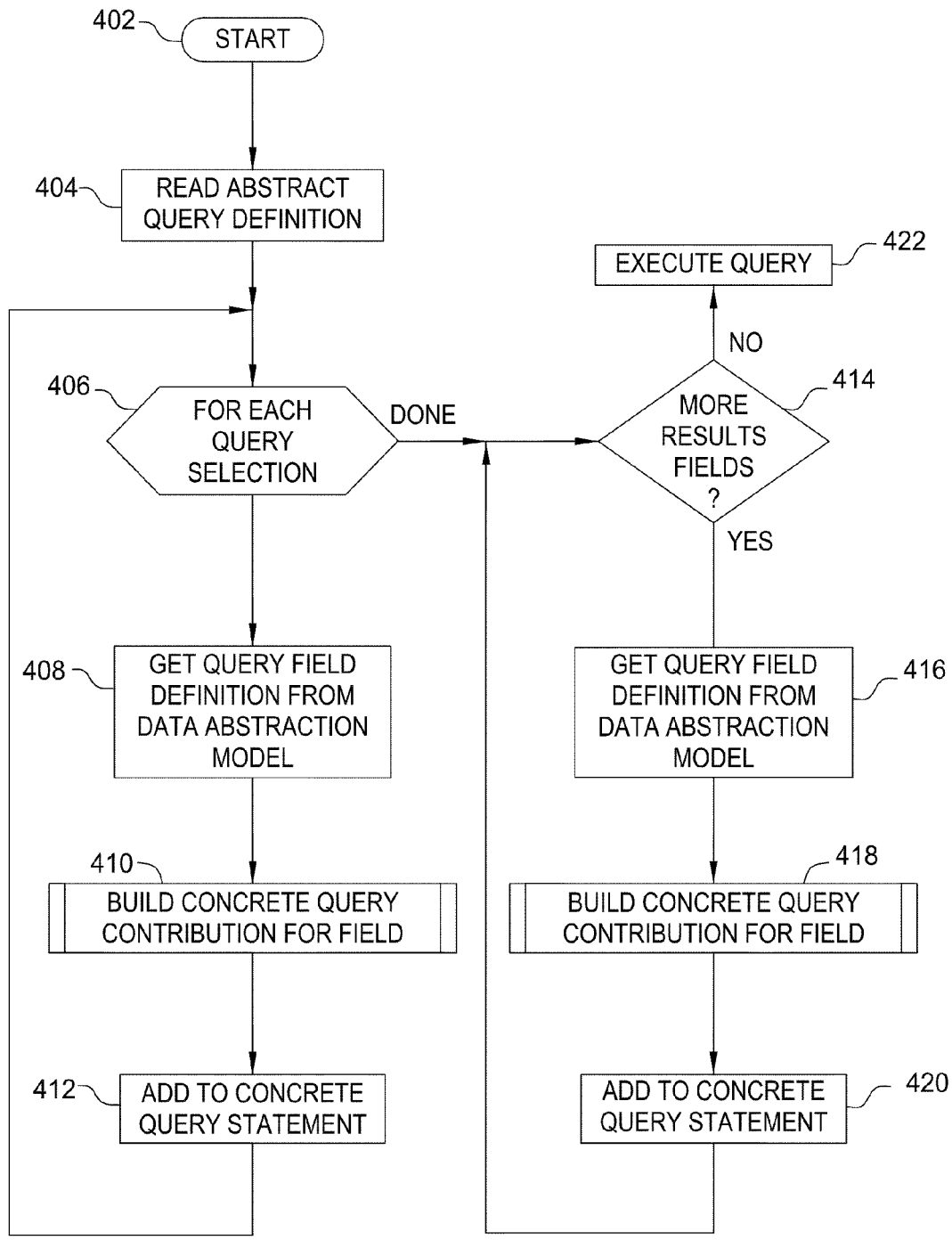
FIGS. 4-5 are flowcharts illustrating the operation of a query builder component, according to one embodiment of the invention.

Referring now to FIG. 4, an illustrative runtime method 400 exemplifying one embodiment of the operation of the query builder component 150 of FIG. 1 is shown. The method 400 is entered at step 402 when the query builder component 150 receives as input an abstract query (such as the abstract query shown in Table I). At step 404, the query builder component 150 reads and parses the abstract query and locates individual selection criteria and desired result fields. At step 406, the query builder component 150 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the query builder component 150 uses the field name from a selection criterion of the abstract query to look up the definition of the field in the data abstraction model 132. As noted above, the field definition includes a definition of the access method used to access the data structure associated with the field. The query builder component 150 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the query builder component 150 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the query builder component 150 looks up a result field name (from the result specification of the abstract query) in the data abstraction model 132 and then retrieves a result field definition from the data abstraction model 132 to identify the physical location of data to be returned for the current logical result field. The query builder component 150 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
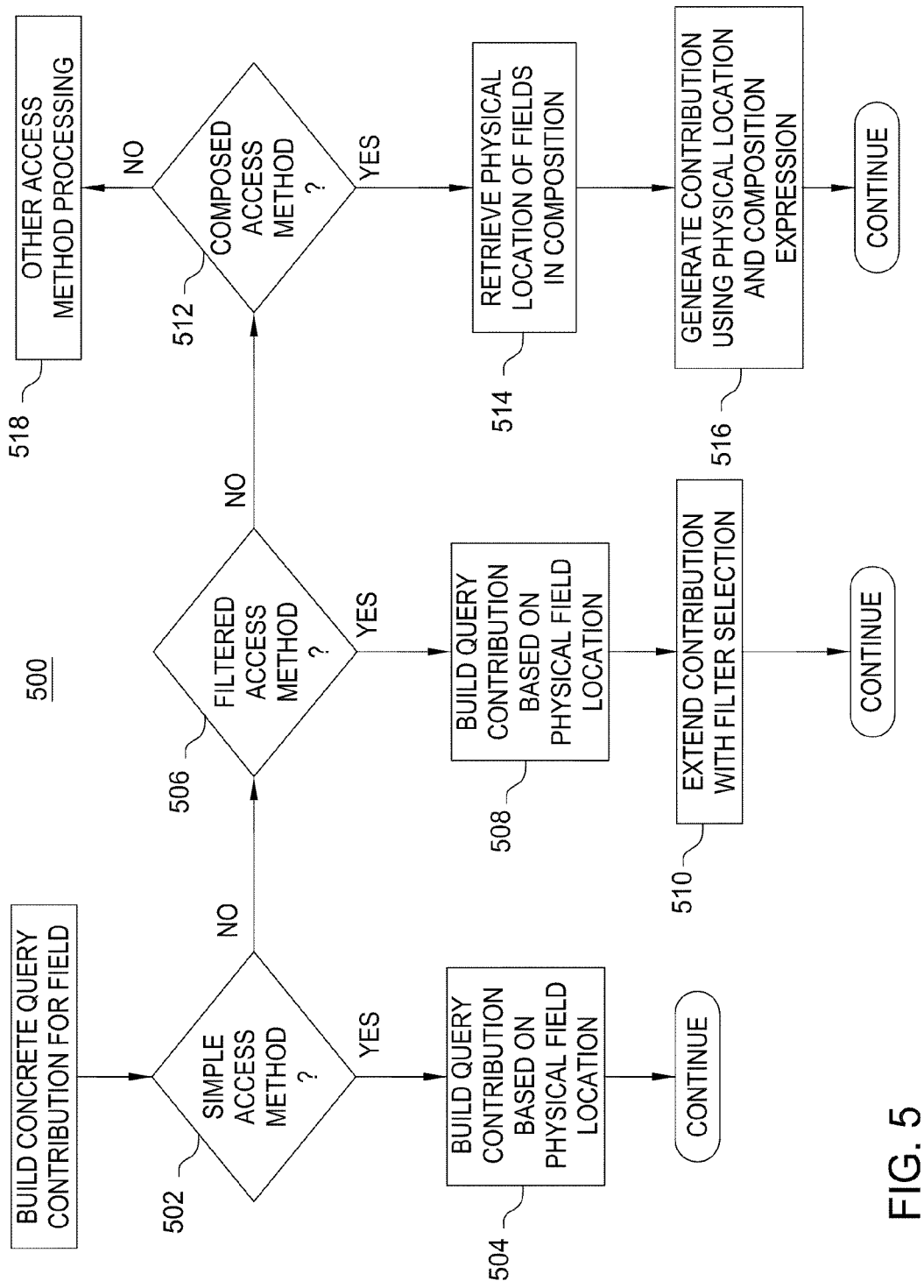

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Identifying Abstract Queries and/or Bi Tools Having Semantic Concepts in Common

As described above, in one embodiment, the application 120 may perform semantic model association between a data abstraction layer in BI tools. To illustrate the embodiment, suppose a data warehouse already exists. Source systems may populate the warehouse (via an extract, transform, and load (ETL) process) and/or serve as data in the warehouse (via a federated process). The data warehouse may include data that is aggregated, cleansed and modeled to conformed dimensions.

Referring now to FIG. 6, exemplary tables stored in the data warehouse of the database 139 of FIG. 1 are shown. The tables include a first table 602 representing patients and a second table 604 representing diagnoses of the patients. As shown, fields 606 of the patient table 602 include a patient identifier, a first name, a last name, and a birth date. Further, fields 608 of the diagnosis table 604 include a patient identifier, a diagnosis code, and a diagnosis date. The patient identifier field of the diagnosis table 604 may be a foreign key that references the patient identifier field of the patient table 602. In one embodiment, the diagnosis code and the diagnosis date may be ICD-9 (International Statistical Classification of Diseases and Related Health Problems, version 9) fields. As is known, ICD-9 defines codes for classifying diseases. Of course, while embodiments herein may described with reference to the field of health sciences—or more specifically, with reference to aggregating data in the field of medical and scientific research and/or pharmaceutical development—those skilled in the art will recognize that such is for illustrative purposes only and is not intended to be limiting of the invention.

In one embodiment, using the data warehouse, the application 120 generates a semantic model table that includes a hierarchy of semantic concepts. The hierarchy standardizes semantic concepts between BI tools. Referring now to FIG. 7, an exemplary semantic model table 702 is shown. The semantic model table 702 includes a "column" field 704 representing a field from the data warehouse. The semantic model table 702 also includes a "concept" field 706 that expresses the semantics of the "column" field from the data warehouse. In other words, the concept field 706 expresses what data stored in the "column" field means in normalized form. In one embodiment, the values stored in the concept field 706 allows different BI tools to relate BI tool objects to common semantic concepts. As used herein, BI tool objects may refer to database objects accessed by one or more BI tools.

In one embodiment, the semantic model table tags data from the data warehouse to a semantic model. Continuing the health sciences example given above, data for labs, procedures, billing codes, etc. are tagged as such in a semantic model that can be accessed by other applications (such as by BI tools and/or by the database abstraction model). For example, an application may determine, from the semantic model table, that data stored in a "DIAG.ICD9" field pertains to billing codes for diagnosis within the system that conform to the ICD-9 standard. That is, the application may perform a lookup using the field DIAG.ICD9 in the semantic model and retrieve a specific identifier that represents a diagnosis under the ICD-9 standard. Put another way, the semantic model table provides concept meaning for the instance values stored for a given field.

Figure 8:
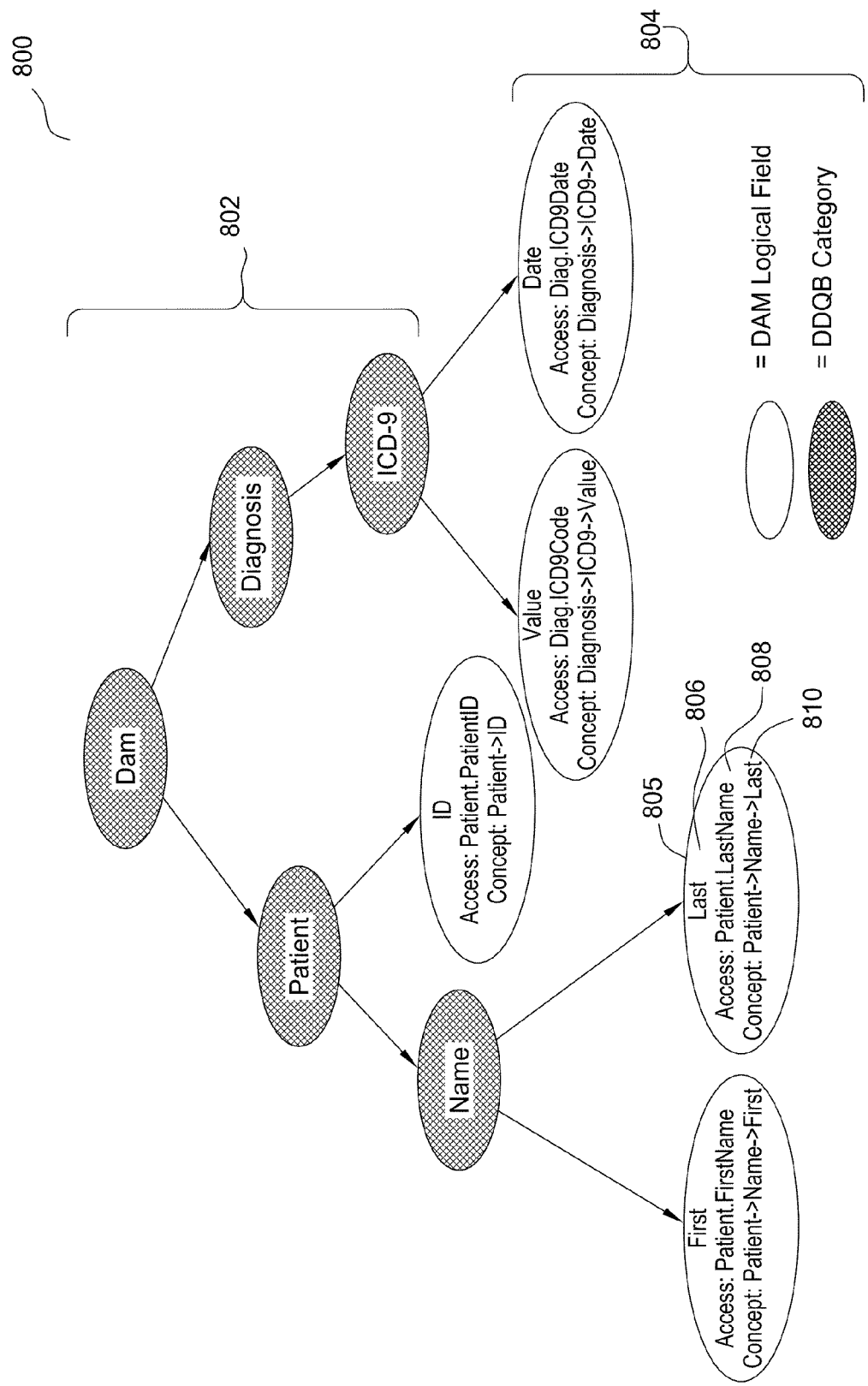
FIG. 8 illustrates a representation of a data abstraction model, according to one embodiment of the invention.

In one embodiment, the data abstraction model is augmented with semantic concepts from the semantic model table 702. Referring now to FIG. 8, a representation 800 of the data abstraction model is shown. The representation 800 includes categories 802 and logical fields 804 of the data abstraction model. In one embodiment, a logical field definition of the data abstraction model may be augmented with a semantic concept from the semantic model table 702. For example, the definition of the logical field 805 representing the last name of a patient may be modified to include a semantic concept designation 810 of "Patient->Name->Last" (i.e., in addition to the logical field name 806 and the access method 808). Depending on the embodiment, the semantic concepts from the semantic model table 702 may be included as part of the process of generating the data abstraction model. Alternatively, the semantic concepts from the semantic model table 702 may be included in the data abstraction model, subsequent to the generation of the data abstraction model. By associating logical fields of the data abstraction model with semantic concepts of the semantic model, the semantic concepts may be used during query generation and data retrieval. For example, during or subsequent to retrieving data responsive to an abstract query, an application using the data abstraction model may also retrieve semantic concepts related to the abstract query and/or to the retrieved data. The semantic concepts are further described below in conjunction with FIG. 17.

In one embodiment, a BI concept repository is generated. In contrast to the semantic model table 702—which normalizes semantic concepts between BI tools—the BI concept repository maps BI tool objects to semantic concepts used by the BI tool objects. The BI concept repository may support broader analytical objectives of the user submitting the abstract query. In one embodiment, the application retrieves aggregated and semantically harmonized data based on user constraints provided in the abstract query—and performs semantic concept mapping of the result set to the BI concept repository. In one embodiment, the semantic concept mapping is performed once by a user and is subject to periodic user review and optimization based on updates to analytical target models. The semantic concept mapping can also be expanded to execute periodically to incorporate changes in the source data and to provide feedback to the user based on updates to the data. Accordingly, an open framework for semantic concept mapping is provided, which may incorporate analytical models and leverage analytical constructs. Examples of analytical constructs include dimensional constructs, non-additive and additive facts, in-line aggregates, star and snow-flake constructs, 3rd normal form constructs, vocabularies, etc.

As described above, the BI concept repository maps BI tool objects to semantic concepts used by the BI tool objects. In one embodiment, access to the BI concept repository is provided to the BI tools. The BI tools may be configured to perform data mining, report writing, dashboarding, etc. The BI concept repository includes information specifying how to launch each BI tool and what semantic concepts the respective BI tool is related to. The data abstraction model and/or one or more abstract queries may also be included as a tool in the BI concept repository, along with any semantic information associated with the data abstraction model and/or the abstract queries.

Figure 9:
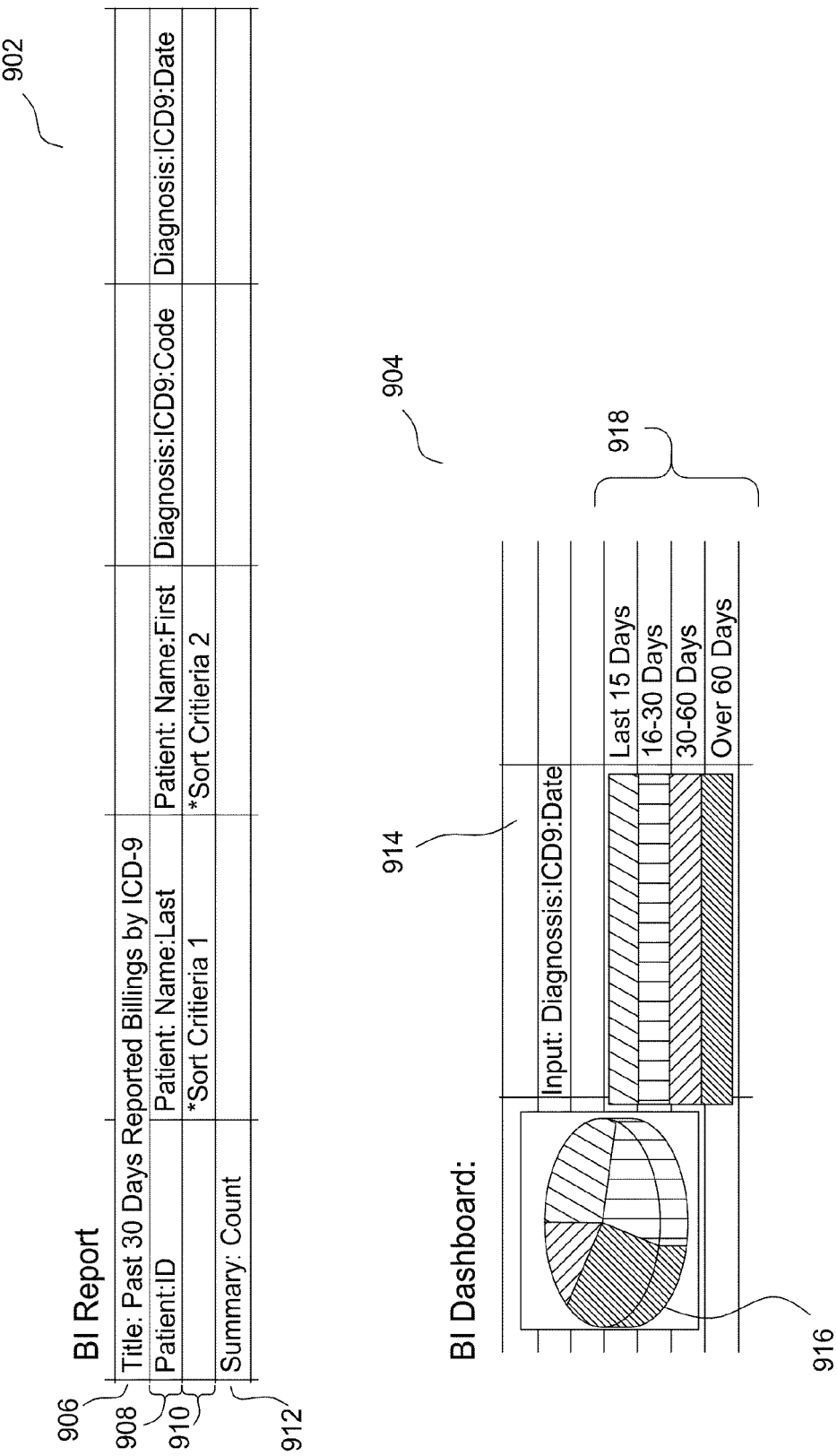
FIG. 9 illustrates two examples Business Intelligence (BI) tools, according to one embodiment of the invention.

Referring now to FIG. 9, two examples of BI tools are shown. The examples include a BI report 902 and a BI dashboard 904. In these examples, colons, rather than dots or slashes, are used to signify that the BI tools may use database tables internally in a different manner that the data abstraction model uses the database tables.

As shown, the BI report 902 specifies to include fields 908 of patient identifier, last name, first name, diagnosis code, diagnosis date, and a summary count 912 in a report having a title 908 of "Past 30 Days Reported Billings by ICD-9". The BI report 902 also specifies two sort criteria 910: last name and first name. In contrast to the BI report 902, which requires several fields 908, the BI dashboard 904 may only require the diagnosis date field 914 and perform its own calculations to generate a graphical representation of the data, such as in the form of a pie chart 916 with an accompanying legend 918.

Referring now to FIG. 10, an exemplary BI concept repository 1002 is shown. The BI concept repository 1002 includes an object field 1004, a tool field 1006, and a semantic concept field 1008. The BI concept repository 1002 maps requirements of each BI tool, abstract query, and/or the data abstraction model to semantic concepts from the semantic model table 702 of FIG. 7.

To further illustrate embodiments of the invention, suppose a user requests to execute the following abstract query against the data abstraction model:

Table III—Abstract Query Example 2

Select Patient/ID, Patient/Name/Last, Diagnosis/ICD-9/Value, Diagnosis/ICD-9/Date Where Diagnosis/ICD-9/Date after Jan. 1, 2010
As shown, the abstract query of Table III specifies to include the patient identifier, the last name, the diagnosis code, and the diagnosis date—for diagnoses after Jan. 1, 2010.

Figure 11:
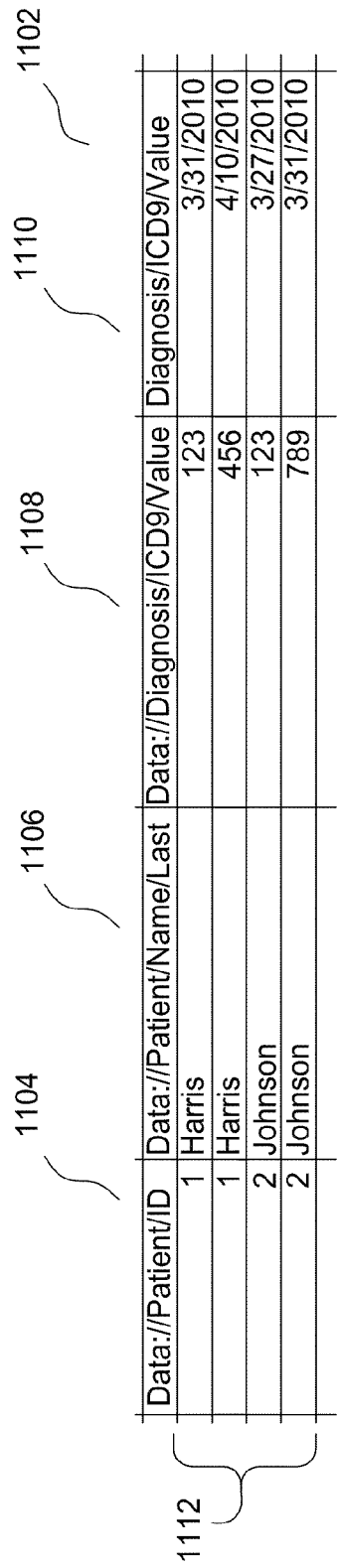
FIG. 11 illustrates query results obtained from executing an abstract query, according to one embodiment of the invention.

FIG. 11 illustrates query results 1102 obtained from executing the abstract query of Table III, according to one embodiment of the invention. As shown, the query results 1102 include the patient identifier 1104, the patient last name 1106, the diagnosis code 1108, and the diagnosis date 1110. Further, the query results 1102 include four records 1112 responsive to the abstract query.

Figure 12:
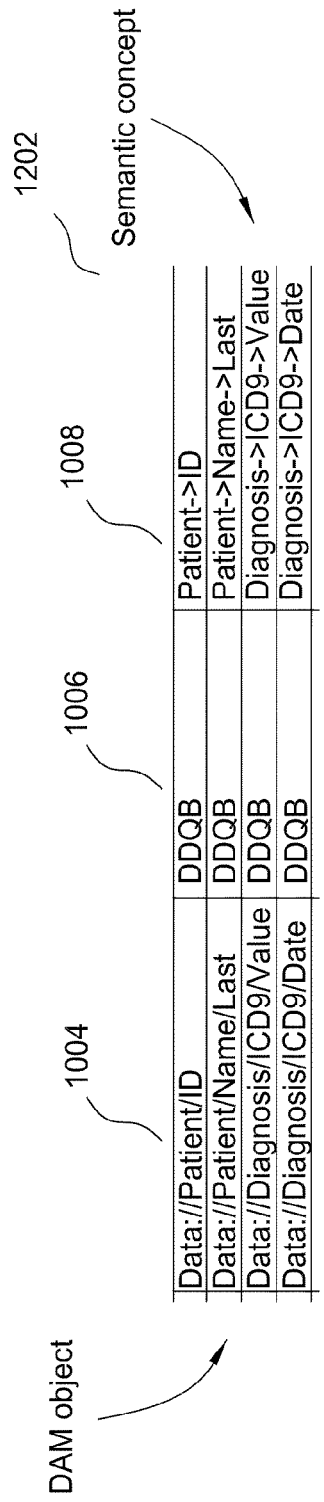
FIGS. 12-13 each illustrate a portion of the BI concept repository, according to one embodiment of the invention.

In one embodiment, using the BI concept repository, the application 120 may determine which semantic concepts are associated with fields of the abstract query of Table III. Referring now to FIG. 12, a portion 1202 of the BI concept repository 1002 is shown. As described above, the BI concept repository 1002 includes an object field 1004, a tool field 1006, and a semantic concept field 1008. The application 120 may determine that the "Patient/Name/Last" field of the abstract query maps to the "Patient->Name->Last" semantic concept.

Figure 13:
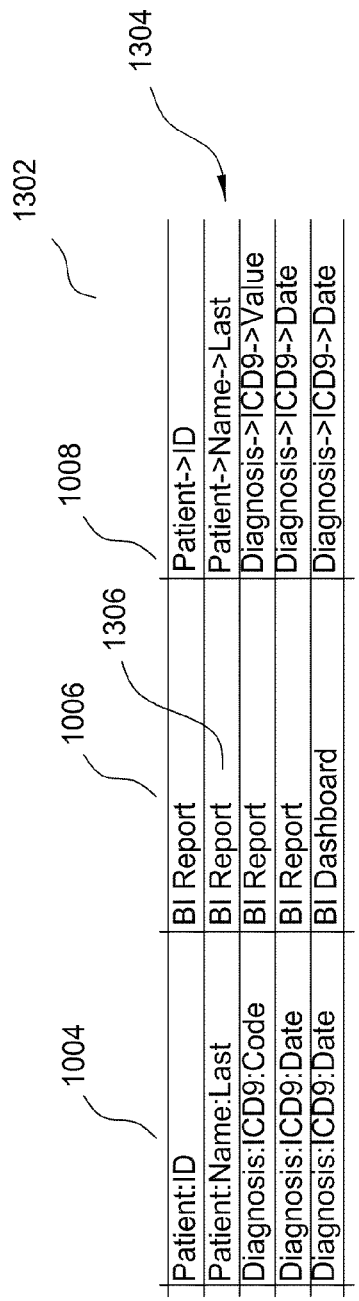

In one embodiment, having identified what semantic concepts were used by the abstract query, the application 120 may then determine which other BI tools use the identified semantic concepts. Referring now to FIG. 13, a portion 1302 of the BI concept repository 1002 is shown. The application 120 may determine that the BI Report 1306 also uses the "Patient->Name->Last" semantic concept 1304 identified from the abstract query in the previous step. The application 120 may then notify the user (who submitted the abstract query) that the BI Report 1306 may also be of interest to the user.

Figure 14:
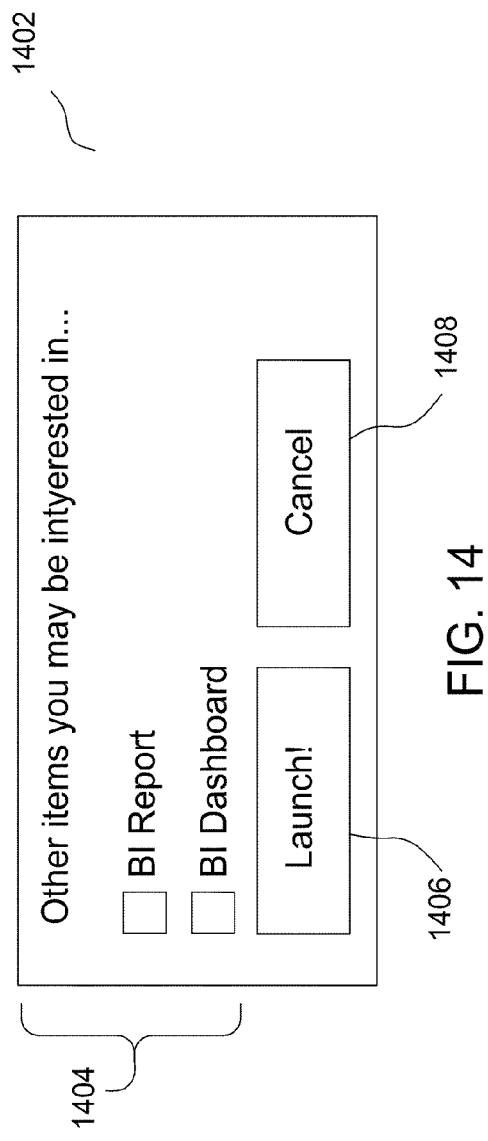
FIG. 14 illustrates an exemplary user interface (UI) screen, according to one embodiment of the invention.

Referring now to FIG. 14, an exemplary user interface (UI) screen 1402 of the application 120 is shown. The UI screen 1402 includes an indication 1404 of BI tools that the user may be interested in. The UI screen 1402 also includes a first button 1406 for launching a selected BI tool and a second button 1408 for exiting the UI screen 1402. The application 120 may output the UI screen 1402 to prompt the user to specify whether to launch one or more of the BI tools that the application 120 determined may be of interest to the user, based on semantic concepts shared between the BI tools and the abstract query.

Referring once again to Table III, the abstract query shown does not specify the patient first name field. However, the BI Report of FIG. 9 specifies the patient first name field. In one embodiment, the BI report does not retrieve data from the results responsive to the abstract query; instead, the BI report may access database tables directly. Consequently, the application 120 is not prohibited from identifying and notifying the user of BI tools that specify a field not referenced in an abstract query.

Of course, those skilled in the art will recognize that the techniques disclosed herein may be used to identify BI tools and abstract queries that use semantic concepts in common. Some embodiments may identify BI tools based on an abstract query received from a user—as is described below in conjunction with FIG. 15. Other embodiments may identify abstract queries based on a BI tool launched by a user—as is described below in conjunction with FIG. 16. Still other embodiments of identifying BI tools and abstract queries that share semantic concepts are broadly contemplated without departing from the scope of the invention.

Figure 15:
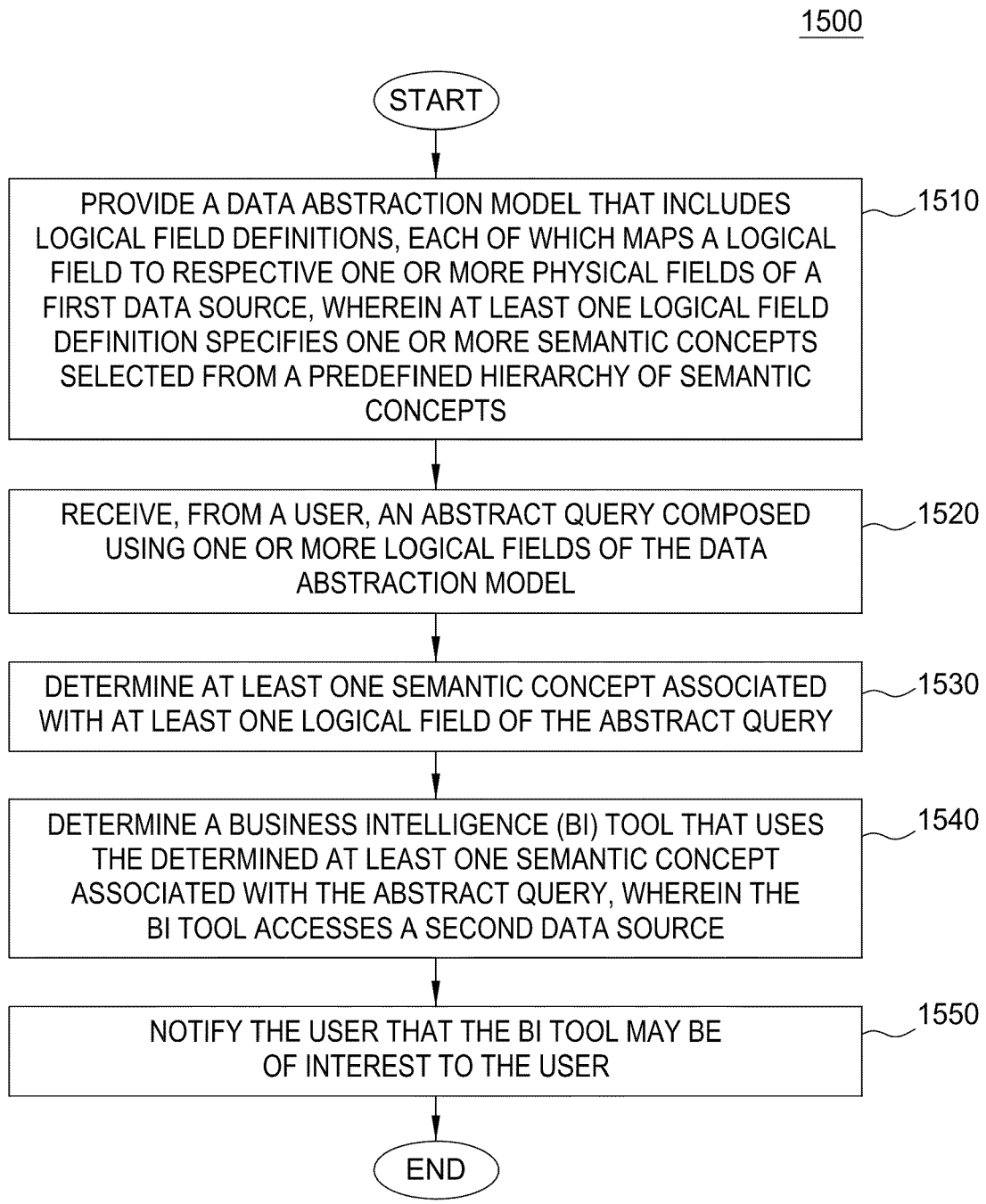
FIG. 15 is a flowchart depicting a method for identifying a BI tool based on an abstract query, according to one embodiment of the invention.

FIG. 15 is a flowchart depicting a method 1500 for identifying a BI tool based on an abstract query, according to one embodiment of the invention. As shown, the method 1500 begins at step 1510, where a data abstraction model is provided that includes logical field definitions, each of which maps a logical field to respective one or more physical fields of a first data source. At least one logical field definition may specify one or more semantic concepts selected from a predefined hierarchy of semantic concepts. At step 1520, the application 120 receives, from a user, an abstract query composed using one or more logical fields of the data abstraction model. For example, the application 120 may receive the abstraction query of Table III.

At step 1530, the application 120 determines at least one semantic concept associated with at least one logical field of the abstract query. For example, the application 120 may consult the BI concept repository 1002 of FIG. 10. At step 1540, the application 120 determines a BI tool that uses the determined at least one semantic concept associated with the abstract query, wherein the BI tool accesses a second data source. The second data source may be the same or a different data source than the first data source, depending on the embodiment. At step 1550, the application 120 notifies the user that the BI tool may be of interest to the user. For example, the application 120 may output the GUI screen 1402 of FIG. 14. After the step 1550, the method 1500 terminates.

Figure 16:
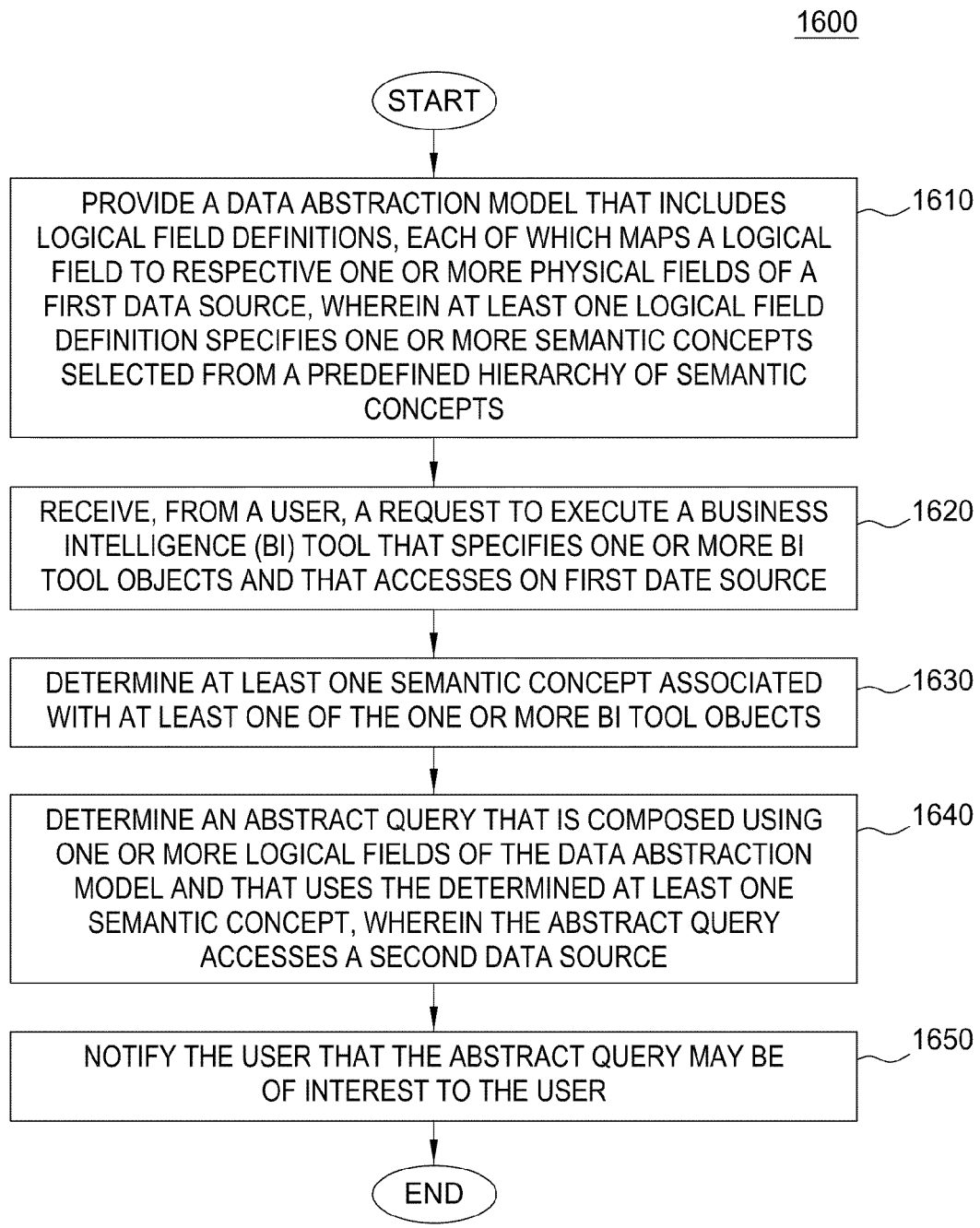
FIG. 16 is a flowchart depicting a method for identifying an abstract query based on a BI tool, according to one embodiment of the invention.

FIG. 16 is a flowchart depicting a method 1600 for identifying an abstract query based on a BI tool, according to one embodiment of the invention. As shown, the method 1600 begins at step 1610, where a data abstraction model is provided that includes logical field definitions, each of which maps a logical field to respective one or more physical fields of a first data source. At least one logical field definition may specify one or more semantic concepts selected from a predefined hierarchy of semantic concepts. At step 1620, a request is received from the user to launch a BI tool 121 that specifies one or more BI tool objects and that accesses a first data source.

At step 1630, the BI tool 121 determines at least one semantic concept associated with at least one of the BI tool objects. For example, the BI tool 121 may consult the BI concept repository 1002 of FIG. 10. At step 1640, the BI tool 121 may determine an abstract query that is composed using one or more logical fields of the data abstraction model and that uses the determined at least one semantic concept, wherein the abstract query accesses a second data source. At step 1650, the BI tool 121 notifies the user that the abstract query may be of interest to the user. For example, the BI tool 121 may output the GUI screen 1402 of FIG. 14. After the step 1650, the method 1600 terminates. And while embodiments are described herein with reference to the application 120 and/or the BI tool 121 performing steps of the methods 1600 and 1700, those of skill in the art will recognize that one or more of the steps may be performed by an application other than the BI tool 121 and the application 120.

Figure 17:
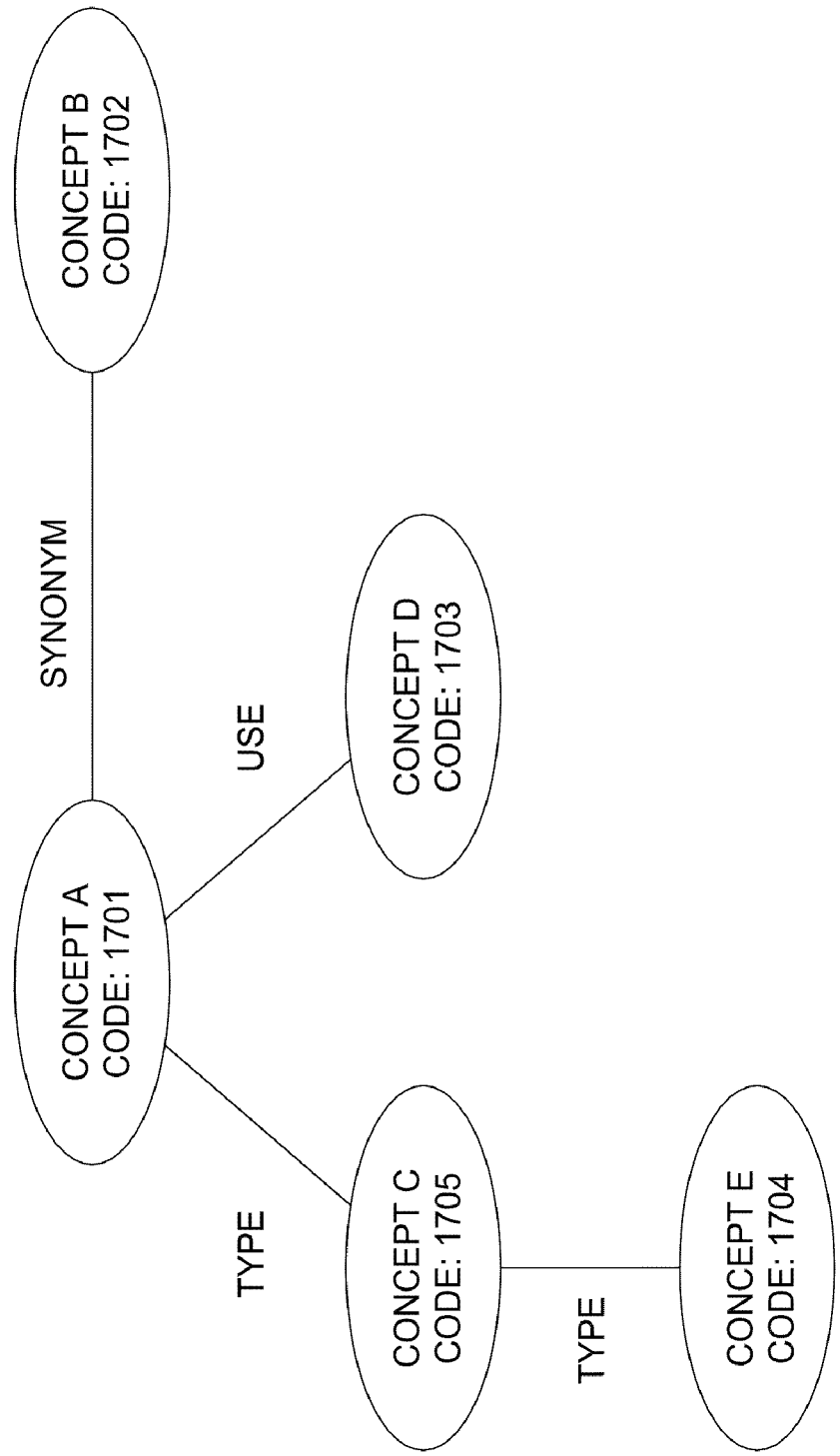
FIG. 17 illustrates an exemplary structure defining relationships between semantic concepts, according to one embodiment of the invention.

As described above, in one embodiment, the semantic model table 702 of FIG. 7 normalizes semantic concepts between BI tools. The BI concept repository 1002 of FIG. 10 then maps requirements of each BI tool, abstract query, and/or the data abstraction model to these semantic concepts. To further illustrate the semantic concepts stored in the semantic table, FIG. 17 illustrates an exemplary structure 1700 defining relationships between semantic concepts A-E. In one embodiment, the structure 1700 may be defined within the data abstraction model. For example, Concept B is defined as a synonym of Concept A. In one embodiment, if a first concept is a synonym of a second concept identified in a received abstract query, metadata regarding the first concept may be sent back to the requesting entity. For example, a description of the concept (such as the concept name) and concept code may be sent to the requesting entity along with the query result. In some embodiments, the metadata may include logical field names and definitions associated with the related concepts.

In an alternative embodiment, if a first concept is synonym of a second concept identified in a received abstract query, a logical field associated with the second concept may be used to generate a local query. For example, a query may include a logical field associated with Concept A. The data abstraction model may include one or more logical fields associated with Concept B, but no logical fields associated with Concept A. Because Concept B is a synonym of Concept A, the logical fields associated with Concept B may be used to compose a local abstract query to retrieve results for the abstract query, even though the concept codes for Concept A and Concept B are different.

As shown in FIG. 17, Concept C is defined as a type of Concept A in the structure 1700. In other words, Concept C may be a subset of Concept A. For example, as discussed above, "Tigers" are a type of "Felines". Also illustrated in FIG. 17 is Concept D, which is defined as a use of Concept A. For example, "Integrated Circuits" may be a use related to "Silicon". As with synonyms, in one embodiment, metadata regarding concepts identified as types or uses may be sent to a requesting entity along with query results. Alternatively, a local query may be generated based on logical fields associated with concepts that are types or uses of concepts identified in a received query.

While synonyms, types and uses are described herein as means for determining related concepts, in alternative embodiments, any other reasonable means for determining relationship between concepts may be used. For example, in some embodiments the relative position of the concepts in the hierarchical structure 1700 may determine whether concepts are related. For example, FIG. 17 illustrates a Concept E which is defined as a type of Concept D. In some embodiments, related concepts for any particular concept may include concepts that are a predetermined number of levels from the concept. For example, if a threshold of 1 is used, Concept C may be a related to Concept A but Concept D will not be related to Concept A.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for determining Business Intelligence (BI) tools and/or abstract queries that use the same or similar semantic concepts. One embodiment provides a semantics table that standardizes semantic concepts across both BI tools and a data abstraction model. Further, a BI concept repository may be provided that maps BI tools to semantic concepts used by the BI tools. A user may be notified of a BI tool and/or of an abstract query that may be of interest to the user, on the basis of the semantic concepts found in common between the BI tools and/or abstract queries. Advantageously, despite the BI tools and data abstraction model being decoupled from one another, the BI tools and the data abstraction model (and/or applications using the data abstraction model) may operate in conjunction to guide a user through different types of tasks having a common semantic (data-centric) theme. Consequently, knowledge may more readily and efficiently be shared between BI tools and abstract queries that are decoupled from one another.

While the foregoing is directed to embodiments of the present invention, other and further embodiments of the invention may be devised without departing from the basic scope thereof, and the scope thereof is determined by the claims that follow.

What is claimed is: -

1. A computer-implemented method to provide a recommendation based on a semantic concept shared between an abstract query and a business intelligence (BI) tool, wherein the method comprises:
providing a data abstraction model that comprises a plurality of logical field definitions, each of which maps a respective logical field to respective one or more physical fields of a first data source, wherein the plurality of logical field definitions includes a first logical field definition specifying at least one semantic concept, wherein the at least one semantic concept is selected from a semantic model table comprising a predefined hierarchy of semantic concepts standardized between the data abstraction model and a plurality of BI tools including the BI tool;

receiving, from a requesting entity, a first one of: (i) the abstract query, wherein the abstract query is composed using one or more logical fields of the plurality of logical fields of the data abstraction model and (ii) a request to execute the BI tool, wherein the BI tool is configured to access one or more fields which data is stored in a second data source;

accessing a concept repository that includes a plurality of mappings between the semantic concepts of the hierarchy and at least one of: (i) the data abstraction model and (ii) the plurality of BI tools, wherein each mapping of the plurality of mappings is defined based on one or more fields that the BI tool of the respective mapping is configured to access, wherein each field of the one or more fields is selected from a logical field and a physical field;

determining, by operation of one or more computer processors and based on the first logical field definition and the concept repository, that the at least one semantic concept characterizes the semantic meaning of: (i) a logical field of the one or more logical fields of the abstract query and (ii) a field of the one or more fields that the BI tool is configured to access; and generating a report recommending the requesting entity to access a second one of: (i) the abstract query and (ii) the BI tool, wherein the report is based on the at least one semantic concept, that is shared between the abstract query and the BI tool, and wherein the report is output to the requesting entity.

2. A computer-readable storage medium containing a program which, when executed, performs an operation to provide a recommendation based on a semantic concept shared between an abstract query and a business intelligence (BI) tool, the operation comprising:

providing a data abstraction model that comprises a plurality of logical field definitions, each of which maps a respective logical field to respective one or more physical fields of a first data source, wherein the plurality of logical field definitions includes a first logical field definition specifying at least one semantic concept, wherein the at least one semantic concept is selected from a semantic model table comprising a predefined hierarchy of semantic concepts standardized between the data abstraction model and a plurality of BI tools including the BI tool;

receiving, from a requesting entity, a first one of: (i) the abstract query, wherein the abstract query is composed using one or more logical fields of the plurality of logical fields of the data abstraction model and (ii) a request to execute the BI tool, wherein the BI tool is configured to access one or more fields which data is stored in a second data source;

accessing a concept repository that includes a plurality of mappings between the semantic concepts of the hierarchy and at least one of: (i) the data abstraction model and (ii) the plurality of BI tools, wherein each mapping of the plurality of mappings is defined based on one or more fields that the BI tool of the respective mapping is configured to access, wherein each field of the one or more fields is selected from a logical field and a physical field;

determining, by operation of one or more computer processors and based on the first logical field definition and the concept repository, that the at least one semantic concept characterizes the semantic meaning of: (i) a logical field of the one or more logical fields of the abstract query and (ii) a field of the one or more fields that the BI tool is configured to access; and generating a report recommending the requesting entity to access a second one of: (i) the abstract query and (ii) the BI tool, wherein the report is based on the at least one semantic concept, that is shared between the abstract query and the BI tool, and wherein the report is output to the requesting entity.

3. A system to provide a recommendation based on a semantic concept shared between an abstract query and a business intelligence (BI) tool, the system comprising:

one or more computer processors;

a memory containing a program which, when executed by the one or more computer processors, is configured to perform an operation comprising:

providing a data abstraction model that comprises a plurality of logical field definitions, each of which maps a respective logical field to respective one or more physical fields of a first data source, wherein the plurality of logical field definitions includes a first logical field definition specifying at least one semantic concept, wherein the at least one semantic concept is selected from a semantic model table comprising a predefined hierarchy of semantic concepts standardized between the data abstraction model and a plurality of BI tools including the BI tool;

receiving, from a requesting entity, a first one of: (i) the abstract query, wherein the abstract query is composed using one or more logical fields of the plurality of logical fields of the data abstraction model and (ii) a request to execute the BI tool, wherein the BI tool is configured to access one or more fields which data is stored in a second data source;

accessing a concept repository that includes a plurality of mappings between the semantic concepts of the hierarchy and at least one of: (i) the data abstraction model and (ii) the plurality of BI tools, wherein each mapping of the plurality of mappings is defined based on one or more fields that the BI tool of the respective mapping is configured to access, wherein each field of the one or more fields is selected from a logical field and a physical field;

determining, by operation of one or more computer processors and based on the first logical field definition and the concept repository, that the at least one semantic concept characterizes the semantic meaning of: (i) a logical field of the one or more logical fields of the abstract query and (ii) a field of the one or more fields that the BI tool is configured to access; and generating a report recommending the requesting entity to access a second one of: (i) the abstract query and (ii) the BI tool, wherein the report is based on the at least one semantic concept, that is shared between the abstract query and the BI tool, and wherein the report is output to the requesting entity.

* * * * *